INVENTOR
MUNRO K. HAYNES
BY John A. Hall
ATTORNEY

INVENTOR
MUNRO K. HAYNES
BY [signature]
ATTORNEY 2,849,705
Patented Aug. 26, 1958

2,849,705

MULTIDIMENSIONAL HIGH SPEED MAGNETIC ELEMENT MEMORY MATRIX

Munro King Haynes, Poughkeepsie, N. Y., assignor to International Business Machines Corporation, New York, N. Y., a corporation of New York

Original application August 25, 1953, Serial No. 376,300, now Patent No. 2,739,300, dated March 20, 1956. Divided and this application June 27, 1955, Serial No. 518,063

5 Claims. (Cl. 340—174)

Figure 1:
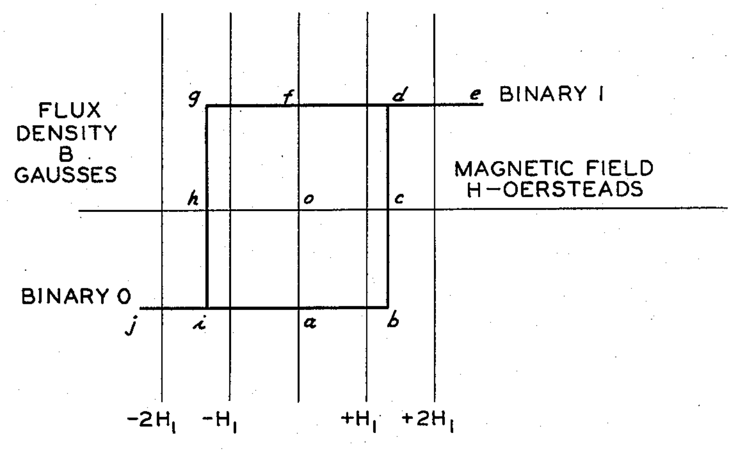

This is a division of application Serial Number 376,300, filed August 25, 1953 now Patent No. 2,739,300.

This invention relates to magnetic storage systems and particularly to means for electrically receiving and magnetically registering and for electrically transmitting coded information.

An essential component of large scale digital computers is a memory device or a registering means for receiving information in the form of "words" each consist- of a plurality of "bits," often expressed in binary notation, and for storing this information over indefinite periods coupled with the facility for giving up this information on demand.

The object of the present invention is to provide extremely high speed means for simultaneously locating a given register and for "writing" therein a given word, consisting of a large plurality of bits or for locating such a register and for extracting and transmitting registered information therefrom. This object comprehends the transmission into or out of the register, of all the bits of a word simultaneously, that is, in parallel relation and within a time interval measured in terms of microseconds. Since the utility of such a device depends on its speed of operation, the object of the present invention is primarily to increase the speed thereof.

The present invention is based on the properties of a known type of magnetic material, spoken of as a bistable magnetic element, that is, a core of magnetic material having high retentivity whereby the remanent flux retained after saturation remains at practically the same value as at saturation. Such an element may be saturated in one direction to establish one magnetic state and later saturated in the other direction to establish a different state, whereby such an element by being driven alternately and selectively to one or the other state may be employed to register the two conditions necessary as a binary element. By using a winding about such a core to produce a positive or a negative magnetomotive force, the magnetic state of the core may be changed at will and, by using another winding, a change of state may be detected in the form of a pulse during such change in state.

A device of this nature is advantageous for several reasons. First, such magnetic cores require no steady state power such as the plate dissipation of an electronic trigger or the holding current for a relay. Second, they require no filament power and consequently generate negligible heat. Third, magnetic cores can be made quite small, that is, in the order of three eighths of an inch outside diameter and one quarter inch long and because of their low power dissipation they may be stacked in compact arrays. Fourth, the service life of a physically protected core is essentially infinite. Fifth, a core's "memory" is substantially unlimited and is independent of power line failures, and sixth, a winding on a core is a two terminal device and therefore it can be switched in two dimensions simultaneously.

In accordance with the present invention a large number of such magnetic elements may be arranged in a multiple matrix or cubical array, constituting a plurality of registers each providing facilities for registering a word having a plurality of bits, the number of registers and the number of word bits being arranged in accordance with the use for which the device will be employed. The device is spoken of as a multidimensional magnetic storage element and, by way of example, finds employment as a memory organ in large scale digital computers.

Further, in accordance with the present invention, a three dimensional arrangement is provided whereby identification of two dimensions may be used as the address of any particular register and operation through the third dimension will selectively operate the various elements of the identified register in accordance with the character of the corresponding word bits. The two address variables select a register or what may be termed a "word line' and a diode in this line prevents sneak paths in the matrix connections. These word lines each extend through a plurality of planes each of which represents a word bit so that the selection or the electrical characterization of each plane has a corresponding effect on the selected word line as it passes through such plane.

Each word line consists of a plurality of magnetic cores equal in number to the number of word bits for which provision is made and a winding for each core, connected in series along the word line, provides a circuit, one end of which may be selected by a first variable and the other end of which may be selected by a second variable. Additionally, a second winding is provided for every core in any given plane and these, being all placed in a series circuit, may be selectively energized to add to or substract from the energizations in their associated core windings. Thus, if the word line coils are all positively energized sufficiently to positively saturate the cores, and then the word bit coils for one word bit are all positively energized but insufficiently themselves to positively saturate the cores, it will appear that that core in which these effects are added will be amply positively energized while all other cores in the said word bit plane will not be affected. If, at another word bit plane, a negative energization is applied to all word bit coils in that plane, but insufficiently to negatively saturate the cores therein, then no core in that plane will be affected, including the particular selected word line bit core. This core will have a resultant weak positive energization while all other cores in that bit plane will have a weak negative energization, insufficient to disturb any positive state previously established therein.

A feature of the invention is a circuit arrangement of coils in a matrix whereby a significantly great energization of a core may be produced. Heretofore a two to one ratio was the best that could be produced in any prior art arrangement which rendered the action comparatively slow (about 700 microseconds with known magnetic materials). In accordance with the present feature a three to one ratio can be achieved and therefore since a greater energization can be applied to the cores, the time taken to achieve saturation is greatly reduced (in the order of 50 microseconds with the same magnetic materials).

In accordance with this feature a circuit arrangement is employed whereby current will flow in the coils of but a single word line so that the magnitude of this current may be larger than in the usual matrix array where a limit is set by the algebraic sum of this and other currents in the coils of other word lines. Where one unit of magnetomotive force is insufficient to cause a change in state in a core of magnetic material and where two units will be sufficient for the purpose, it has not heretofore been possible to provide a combination of currents in the different coils of a magnetic element greater than two units. However, due to the fact that a unique selection of but a single word line is made the current transmitted through this word line may be much larger than heretofore. By transmitting current through the bit coils (connected in series with bit coils of other word lines) to add to or subtract from the effects of the current transmitted through the word line coils, a greater algebraic sum may be achieved. Thus, if current for two units of energization is transmitted through the word line coils a change of state may be accomplished by transmitting another unit through the bit coil making an algebraic sum of three units while allowing but a single unit in the other bit coils of the same level, thus leaving the other bit plane cores unaffected. Likewise, when a particular core of the selected word line is to be left unaffected, an inhibiting current for one unit of magnetization is transmitted to the bit coils of a corresponding level so that the algebraic sum in the selected word line core is but a single unit whereby that core is left unaffected and the other bit coils of the same level have a negative single unit and they also are left unaffected.

By means of this arrangement a three to one ratio is obtained whereby a change of state may be brought about in a lessened time interval.

Another feature of the invention is a circuit arrangement whereby the coils of a word line may be energized in a given direction while the bit coils associated therewith may be selectively and directionally energized whereby the resultant energization of the cores of a word line may be selectively and separately made to be the sum or the difference of two simultaneously applied energizations thereof.

Another feature of the invention is the coincident selection of the two ends of the coil circuit for a word line whereby the elaborate precautions heretofore taken to guard against the effect of sneak paths in a matrix are largely eliminated, it now being necessary to provide but a single diode in each word line circuit.

Other features will appear hereinafter.

Figure 2:
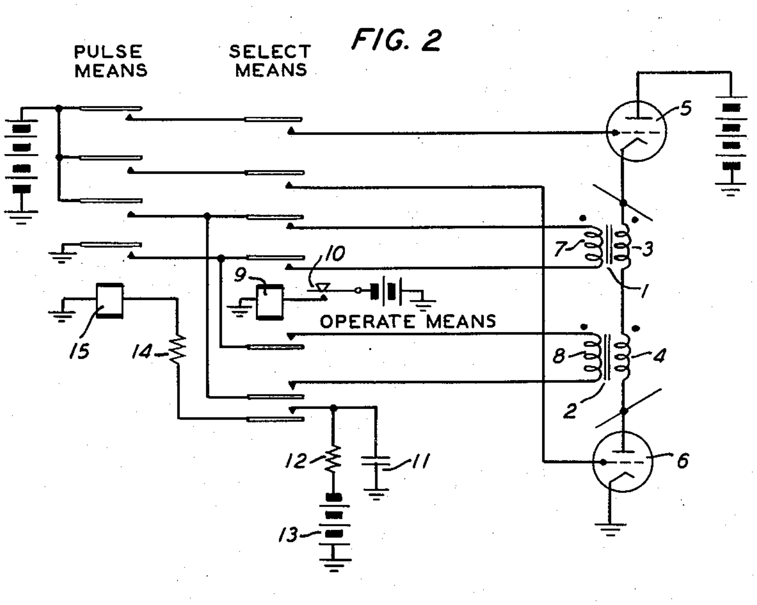
Figure 3:
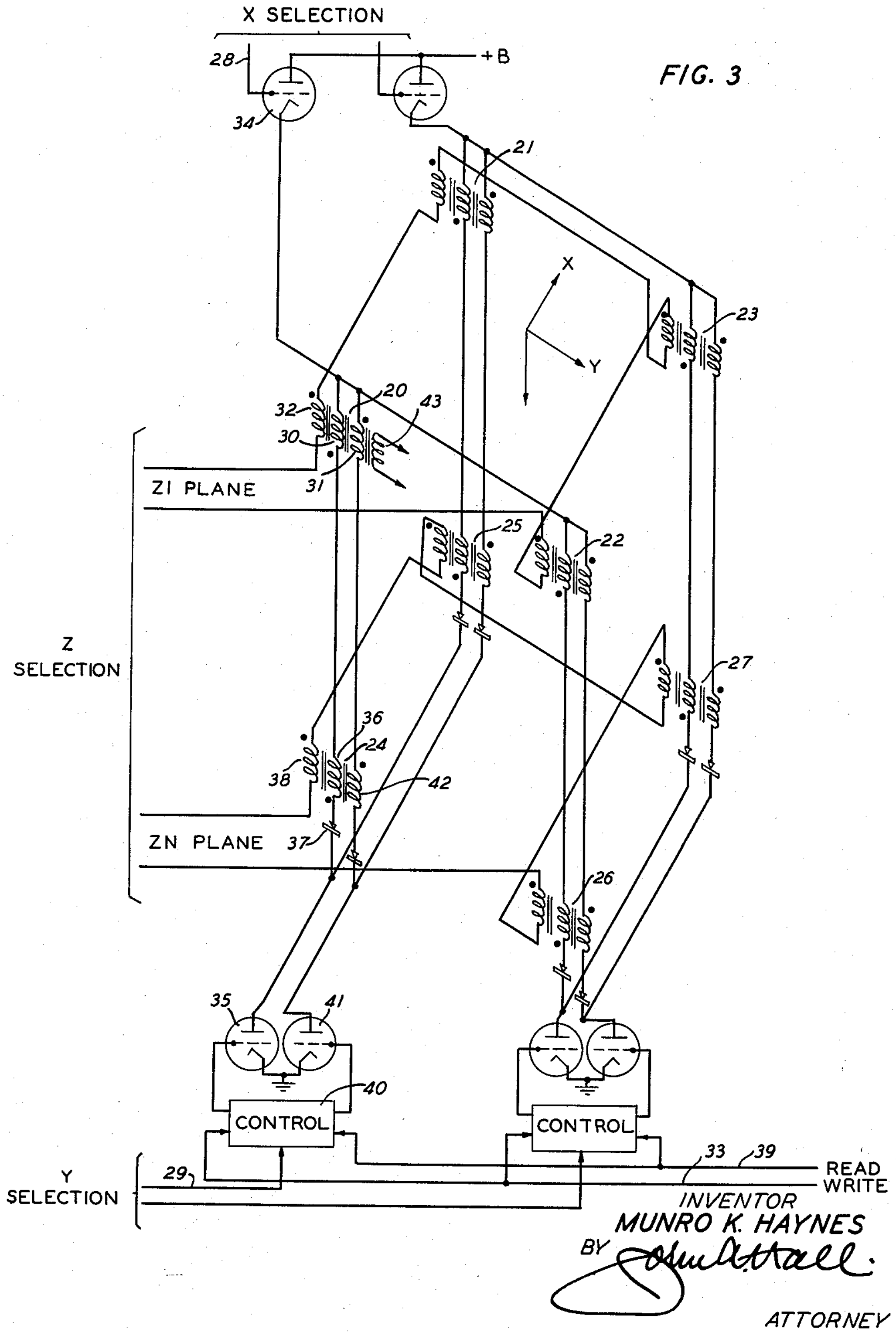

The drawings consist of two sheets having three figures, as follows:

Fig. 1 is an idealized hysteresis loop showing the most desirable type of magnetic material which may be employed for the purposes of the present invention;

Fig. 2 is a schematic circuit diagram showing how one of two magnetic elements may be driven through a change in magnetic state, while the other of the two remains unaffected; and Fig. 3 is a schematic circuit diagram represented in isometric projection to show how eight magnetic elements may be arranged in a cubical array of four word lines each having two bits and how these word lines may be selected through two of the dimensions of such cubical array and the bits thereof selectively activated through the third dimension thereof.

Fig. 1 is an idealized hysteresis curve of the magnetic material used for the purposes of this invention and is a close approximation to what may actually be obtained in practice. It has high retentivity so that if it is positively saturated at some time to the point *e* it will retain a flux density represented by the point *f*. Let us assume that it is in the state to represent binary 0, that is, it has been negatively saturated to the point *j* and then relaxed to the point *a*. Now if a magnetomotive force sufficient to saturate it in the positive direction is applied, the curve *abcde* will be traced and when this energization is relaxed it will return to the point *f*. In this state it will represent binary 1. If thereafter it is again positively energized toward saturation at *e*, either slightly or very strongly, no change in state will occur, the material returning in any case to the state at *f*. Likewise, if the material is energized negatively toward *g*, but not sufficiently to reach the point *g*, no change in the state will occur, the material returning to the state at *f*. However, if the material is negatively energized more than sufficiently to reach the point *g*, then the curve *fghij* will be traced and when the energization is relaxed the material will return to the state represented by the point *a*.

For purposes of further discussion it will be noted that from point *a* an energization of $+H_1$ is insufficient to cause a change in state, but an energization of $+2H_1$ or more will drive the material to saturation and then on relaxation to point *f*. Likewise, an energization of $-H_1$ will not cause a change of state from point *f*, but an energization of $-2H_1$ or more will cause a change of state, leaving the material finally at point *a*.

Fig. 2 is a circuit diagram used as an example of a means whereby information in the form of binary states may be stored. There are shown two cores 1 and 2 of material having the characteristics depicted in Fig. 1. Each core is provided with two energizing windings, the winding 3 of core 1 and the winding 4 of core 2 being in series and in circuit with the tubes 5 and 6. When these tubes are rendered conductive, sufficient current will flow through the windings 3 and 4 to provide a positive magnetomotive force in the associated cores 1 and 2 respectively a value of $+2H_1$. These cores are also provided with another winding, 7 on core 1 and 8 on core 2. Assuming that both the cores are at binary 0, that is, both are in the state represented by the point *a* in Fig. 1, then, if coil 7 is connected in a circuit so that sufficient current will flow to provide an energization of $+H_1$, and this is done while the coil 3 is energized, then the resultant energization will be $+3H_1$ and the core will be driven to the point *e* or beyond so that upon relaxtion this core 1 will return to the state represented by the point *f*, representing binary 1. Likewise, if coil 8 is connected in a circuit whereby sufficient current will flow to provide an energization of $-H_1$ and this is done while the coil 4 is energized, then the resultant energization will be $+H_1$ and the state of the core 2 will not be changed so that upon relaxation this core 2 will return to the state represented by the point *a*, representing binary 0.

The rest of the circuit is a means whereby the energization of the coils above described may be produced. A relay 9 is provided in a circuit with a circuit maker 10 and a battery so that upon the operation of this circuit maker the relay 9 will be operated. A condenser 11 is normally connected in series with a resistance 12 and is normally charged to the potential of the battery 13. Upon the operation of the relay 9 the condenser 11 is connected in circuit with a resistance 14 and a relay 15. As a result the condenser discharges through the relay 15 and the relay 15 operates transiently and for a very brief period. During this period a positive potential is applied to the grids of tubes 5 and 6 and a pulse of current will flow through the coils 3 and 4. At the same time coil 7 is connected in a circuit to energize the core 1 positively and the coil 8 is connected in a circuit to energize the core 2 negatively. Thus a transient energization of the various coils is produced in the manner described.

The circuit of Fig. 2 does not purport to represent any particularly useful arrangement but is submitted for the purpose of showing how the cores may be driven to one or the other state by the coincident application of appropriate positive or negative pulses to different parts of the circuit and it will render the following schematic circuits easily understood with a minimum of circuit detail. The relay 9, marked "select means," represents the means for selecting the particular tubes, such as the tubes 5 and 6, and for applying current pulses of the proper polarity to the word bit coils such as the coils 7 and 8. The relay 15 represents the pulse means, that is the means which will be employed to produce and transmit the several pulses simultaneously. It will be realized that a relay such as relay 15 could not in practice be used for this purpose as it is much too slow for the high speed operation possible in the employment of the magnetic core elements of the present invention. Fig. 2, however, will serve to show how such elements may be controlled.

Applicant proposes that a large array of coils to constitute a plurality of registers or word lines, each having a plurality of coils corresponding to word bits be interconnected in a circuit configuration which may be represented in the three dimensions of an isometric drawing. A line which may be the intersection of a plane perpendicular to advance in the X direction with a plane perpendicular to advance in the Y direction, will represent the coil circuit of Fig. 2. Each coil therein represents an intersection of this line with a plane perpendicular to advance in the Z direction. The various word lines are interconnected in a matrix and therefore a diode must be placed in each word line to prevent sneak paths.

Fig. 3 is a representation of what may be termed a three dimensional array of four word lines each having means for storing two word bits. A practical device for a large scale computer might have as many as 4096 word lines (64 X planes and 64 Y planes) each of 40 bits (40 Z planes), but this 2 by 2 by 2 arrangement of Fig. 3 will serve to illustrate the principle employed.

In this figure, eight cores 20 to 27 inclusive are shown. It will be noted that cores 20, 22, 24 and 26 are in the same X plane, that cores 20, 21, 24 and 25 are in the same Y plane, and that cores 20, 21, 22 and 23 are in the same Z plane. Thus, by the X selection of conductor 28 and the Y selection of conductor 29, the word line consisting of cores 20 and 24 may be selected. Through the selective connections applied to the various Z planes, the cores 20 and 24 may be selectively affected.

Each core is shown with three coils, one for writing, one for reading and one for the selective registration of a word bit in that particular core. Thus, core 20 is provided with a coil 30 in the write circuit, coil 31 in the read circuit and coil 32 in the Z1 plane for the Z1 bit. Each of these coils is characterized by a dot to indicate polarity, and it will be noted that the polarity of the read coil 31 is opposed to that of the write coil 30. The connections of all the Z coils is the same so that the polarity of the coils in the various Z planes is controlled outside the matrix by selective application of energizing current to the connections for each such plane.

Now if a word is to be registered in the word line represented by the cores 20 and 24, the connections 28 and 29 are selected and the write control conductor 33 is employed, whereby tubes 34 and 35 are rendered operative. The current carrying capacity of this circuit from plus battery through tube 34, coil 30, coil 36 of core 24, diode 37, and tube 35 to ground is such that each of the cores 20 and 24 will be energized by a magnetomotive force of $+2H_1$ (see Fig. 1). Due to the diode 37 no sneak paths may be established. This energization of the cores is sufficient to affect a change of state therein assuming they are both in the state to represent binary 0. However, the possible change of state depends on the simultaneous action of coils 32 and 38. If it is assumed that at this time the coil 32 is energized to provide a magnetomotive force in the core 20 of $+H_1$, then the resultant therein is $+3H_1$ and a change of state will be produced. A magnetomotive force of $+H_1$ will also be produced in the other cores 21, 22 and 23 of the Z1 plane but this is insufficient to affect the state of any of these cores and so will not disturb the corresponding bits of words written therein in some other previous operation. If it is assumed that at this same time the coil 38 is energized to provide a magnetomotive force in the core 24 of $-H_1$, then the resultant force therein will be $+H_1$ $(+2H_1-H_1)$ and no change of state in the core 24 will be produced. At the same time the other cores 25, 26 and 27 in the ZN plane will be energized to $-H_1$, but this is insufficient to cause any change in state in these cores regardless of whether they have been previously driven to express binary 0 or binary 1.

It will also be seen from Fig. 3, that if the read conductor 39 is affected instead of the write conductor 33, then through the control means 40 the tube 41 instead of the tube 35 will be rendered conductive. In this case the read coils 31 and 42 will be energized instead of the write coils 30 and 36. Since the polarity of the read coils is opposed to that of the write coils, each of the cores 20 and 24 may be given a $-2H_1$ energization or more highly negative as desired. The Z plane coils are not concerned in the read operation and hence all cores in this word line will be driven to express binary 0.

By way of example, each of the cores may be supplied with a fourth coil such as the coil 43 on the core 20. As the core 20 changes its state from positive (binary 1) to negative (binary 0) the collapse of its positive field and the building up of its negative field will induce a pulse in the coil 43 which may be taken off into an appropriate circuit, where it may be usefully employed.

A pulse of opposite polarity will be induced in the coil 43 when the state of the core is being changed from binary 0 to binary 1, that is, during a "write" operation, which may be usefully employed when there is occasion for such an operation.

Thus it will be seen that by applicant's circuitry by which the coils of the selected word line alone are energized, a greater ratio of energization may be achieved. Heretofore, where the coils in the matrix were directly energized, the resultant energizations of other coils necessarily had to be proportioned so that the algebraic sum of energizations of other coils, in the matrix but not in the selected word line, was always less than that necessary to produce a change in state with the consequence that a two to one ratio was the best that could be achieved. With applicant's coincident selection of the two ends of a word line circuit, it appears that a three to one ratio may be obtained (and an even greater ratio on the read operation). In consequence the speed of operation may be greatly increased, by way of example, from a value in the order of 700 microseconds to a value in the order of 50 microseconds.

What is claimed is:

1. Apparatus for storing information electrically by selectively and directionally electromagnetizing each of a plurality of bistable magnetic elements capable of retaining a high degree of the magnetization to which said elements are subjected, comprising a matrix connection of a plurality of series of said elements, a said series of said elements constituting a word line and each element of a said series constituting a word bit, a diode in each said word line to confine current flow therethrough to one direction, a first plurality of matrix connections each having a group of said word lines connected by one end of each of the word lines thereto and a second plurality of matrix connections each having a group of said word lines connected by the other end of each of the word lines thereto, said connections being so arranged that any one of said first plurality of matrix connections is connected to any one of said second plurality of matrix connections through but a single one of said word lines, means for selectively, concurrently and transiently transmitting an energizing current through a given one of said word lines, and a plurality of additional energizing means transiently, concurrently and concurrently with said first current transmitting means and corresponding with the various elements of said series for selectively and directionally energizing said elements of said selected series, said additional energizing means comprising an additional coil for each said element of said word line, which may be selectively energized to add to or subtract from a magnetization of said element in a direction to a state to express binary 1 where said element is normally in a state to express binary 0, or to leave said element in a state to express binary 0 respectively.

2. Apparatus for storing information electrically by selectively and directionally electromagnetizing each of a plurality of bistable magnetic elements capable of retaining a high degree of the magnetization to which said elements are subjected, comprising a matrix connection of a plurality of series of said elements, a said series of said elements constituting a word line and each element of a said series constituting a word bit, a diode in each said word line to confine current flow therethrough to one direction, a first plurality of matrix connections each having a group of said word lines connected by one end of each of the word lines thereto and a second plurality of matrix connections each having a group of said word lines connected by the other end of each of the word lines thereto, said connections being so arranged that any one of said first plurality of matrix connections is connected to any one of said second plurality of matrix connections through but a single one of said word lines, means for selectively, concurrently and transiently transmitting an energizing current through a given one of said word lines, and a plurality of additional energizing means transiently, concurrently and concurrently with said first current transmitting means and corresponding with the various elements of said series for selectively and directionally energizing said elements of said selected series, each said element in each said word line being provided with a coil connected between one of said matrix connections of said first plurality and one of said matrix connections of said second plurality and wherein the energization of said coil is in the order of 2H where an energization in the order of 1H is only just insufficient to produce a coercive force great enough to overcome the normal magnetization of said element, and wherein additional coils are provided for said additional energizing means whereby an energization of one of said additional coils will provide either an energization in the order of 1H to be added to said first energization to make a total energization of 3H or an energization in the order of $-1H$ to be subtracted from said first energization to make a total energization of $-1H$, whereby said elements may be driven to a magnetization in a direction opposite to their normal state or alternatively left undisturbed in their said normal state.

3. Apparatus for storing information electrically by selectively and directionally electromagnetizing each of a plurality of bistable magnetic elements capable of retaining a high degree of the magnetization to which said elements are subjected, said elements being connected in a matrix arranged circuit, each said element being responsive to an energization in the order of between one and two units of energization, means for normally applying two units of energization thereto, and means for controlling said elements consisting of additional means for adding another unit of energization thereto or for alternatively "subtracting" another unit of energization therefrom.

4. Apparatus for storing information electrically by selectively and directionally electromagnetizing each of a plurality of bistable magnetic elements capable of retaining a high degree of the magnetization to which said elements are subjected, said elements being connected in a matrix arranged circuit, each said element being responsive to an energization in the order of between one and two units of energization, a plurality of energizing coils for each said element including one controlling coil, means for selecting and energizing said coils through the double selection of both terminals thereof, said elements being responsive to the concurrent positive energization of more than two of said plurality of coils and unresponsive when one of said coils provides a negative energization whereby said elements become energized through an excessive energization thereof.

5. Apparatus for storing information electrically by selectively and directionally electromagnetizing each of a plurality of bistable magnetic elements capable of retaining a high degree of the magnetization to which said elements are subjected, means for producing an excessive or an insufficient magnetization of each said element by the algebraic sum of two magnetomotive forces, a sufficient magnetomotive force being produced by a circuit each end of which is independently selected and an additional magnetomotive force for addition to or for subtraction from said sufficient force being produced by a single selection.

References Cited in the file of this patent

UNITED STATES PATENTS

| | | |
|---|---|---|
| 1,547,964 | Semat | July 28, 1925 |
| 2,696,600 | Serrell | Dec. 7, 1954 |
| 2,736,880 | Forrester | Feb. 28, 1956 |
| 2,739,300 | Haynes | Mar. 20, 1956 |
| 2,740,949 | Counihan | Apr. 3, 1956 |
| 2,769,968 | Schultheis | Nov. 6, 1956 |
| 2,784,391 | Rajchman | Mar. 5, 1957 |

OTHER REFERENCES

"New Ferrite-Core Memory Used Pulse Transformer" (Papian), Electronics, pp. 194 to 197, March 1955. Copy in 340–174C (45), Div. 42.

"A Coincident-Current Magnetic Memory Cell for the Storage of Digital Information" (Papian), Proceedings of the I. R. E., April 1952, pages 475–478. Copy in 340–174C (12) Div. 42.

"Static Magnetic Matrix Memory and Switching Circuits" (Rajchman), RCA Review, vol. 13, Issue 2, June 1952, pages 183–190. Copy in 340–174C (17), Div. 42.